Aug. 11, 1964 B. D. LUMMIS 3,144,518

"MEET ME" CONFERENCE PRIVACY SYSTEM

Filed Jan. 26, 1962 2 Sheets-Sheet 1

INVENTOR.
BRUCE D. LUMMIS
BY W. J. Shanley Jr.
ATTORNEY

Aug. 11, 1964 B. D. LUMMIS 3,144,518

"MEET ME" CONFERENCE PRIVACY SYSTEM

Filed Jan. 26, 1962 2 Sheets-Sheet 2

3,144,518

"MEET ME" CONFERENCE PRIVACY SYSTEM

Bruce D. Lummis, Washington, D.C., assignor to General Dynamics Corporation, Rochester, N.Y., a corporation of Delaware Filed Jan. 26, 1962, Ser. No. 168,919
8 Claims. (Cl. 179—18)

This invention relates to a conference circuit and, more particularly, to a conference circuit of the "meet me" type.

In "meet me" type conferences, the parties to the conference each dial a predetermined number for establishing a conference circuit between the parties. The "meet me" type conference circuits of the prior art have a major disadvantage in that anyone is allowed access to the conference line, even when busy, and, therefore, it is impossible to obtain privacy in such a conference circuit.

It is, therefore, an object of my invention to provide a "meet me" type conference circuit in which privacy of the parties using the conference circuit is assured.

It is a further object of my invention to provide a "meet me" type conference circuit in which one of the parties to the conference may deny access to the busy conference line to any other party which later dials the conference line.

It is a further object of my invention to provide a "meet me" type conference circuit in which privacy may be assured by any of the parties to the conference by manipulating his dial.

In accordance with my invention, a conference privacy relay is provided for marking the conference line busy. This is accomplished, after all parties to be included in the conference have dialed the conference number, by operating the conference privacy relay from its normal position over the dial circuit in response to any of the parties to the conference dialing the digit "1." In response to the operation of the conference privacy relay, dial tone, which is normally applied to the conference circuit, is removed and the conference circuit is marked busy to later arriving subscriber lines. Thus, any party arriving at the conference line after the operation of the conference privacy relay will get a busy signal.

Privacy is then maintained until the last party leaves the conference or until one of the parties to the conference again dials the digit "1" which will deenergize the conference privacy relay, thus allowing access to the conference line by any other line until the digit "1" is again dialed by one of the parties to the conference.

Thus, in accordance with my invention, privacy in the conference circuit is completely under the control of parties to the conference. This control is obtainable without requiring any additional control devices at the subscriber stations. In addition, in accordance with my invention, when a party to the conference circuit leaves the conference, he may not thereafter gain access to the conference circuit without one of the remaining parties to the conference granting him access by dialing the digit "1."

Figure 1A:
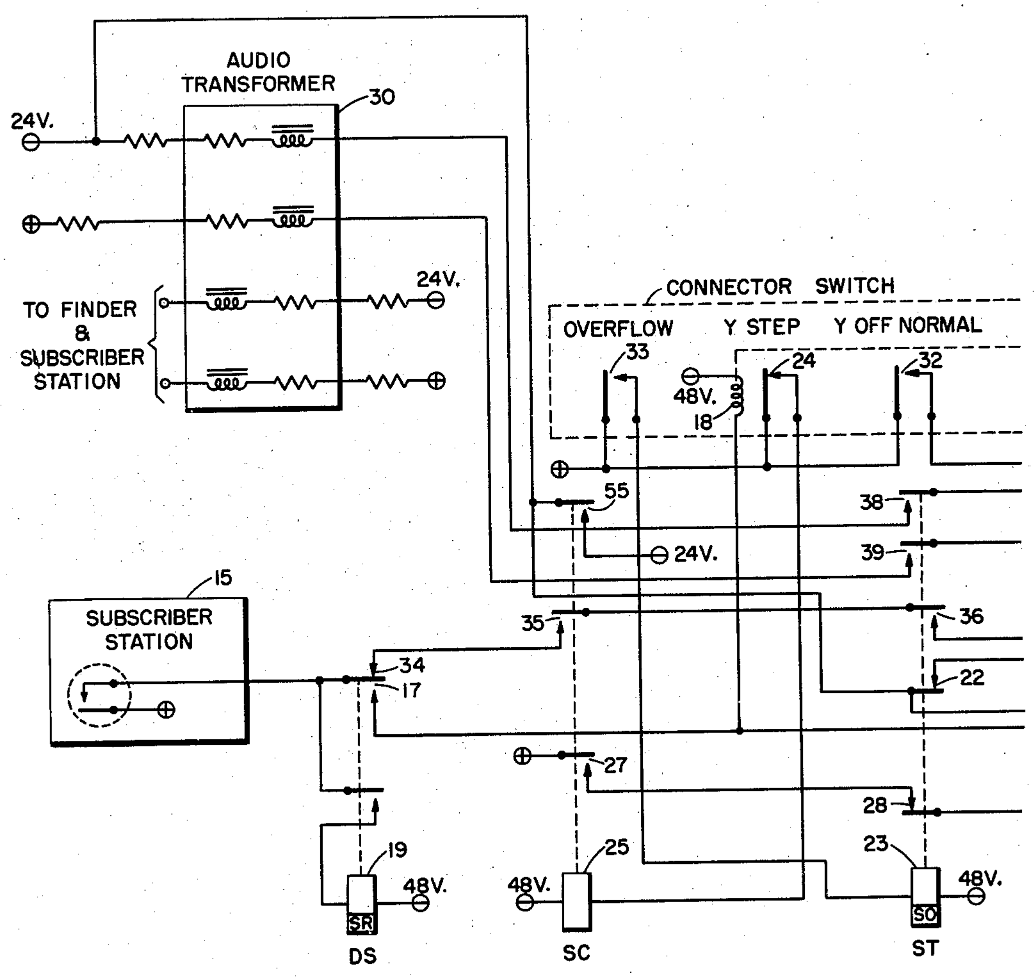
Figure 1B:
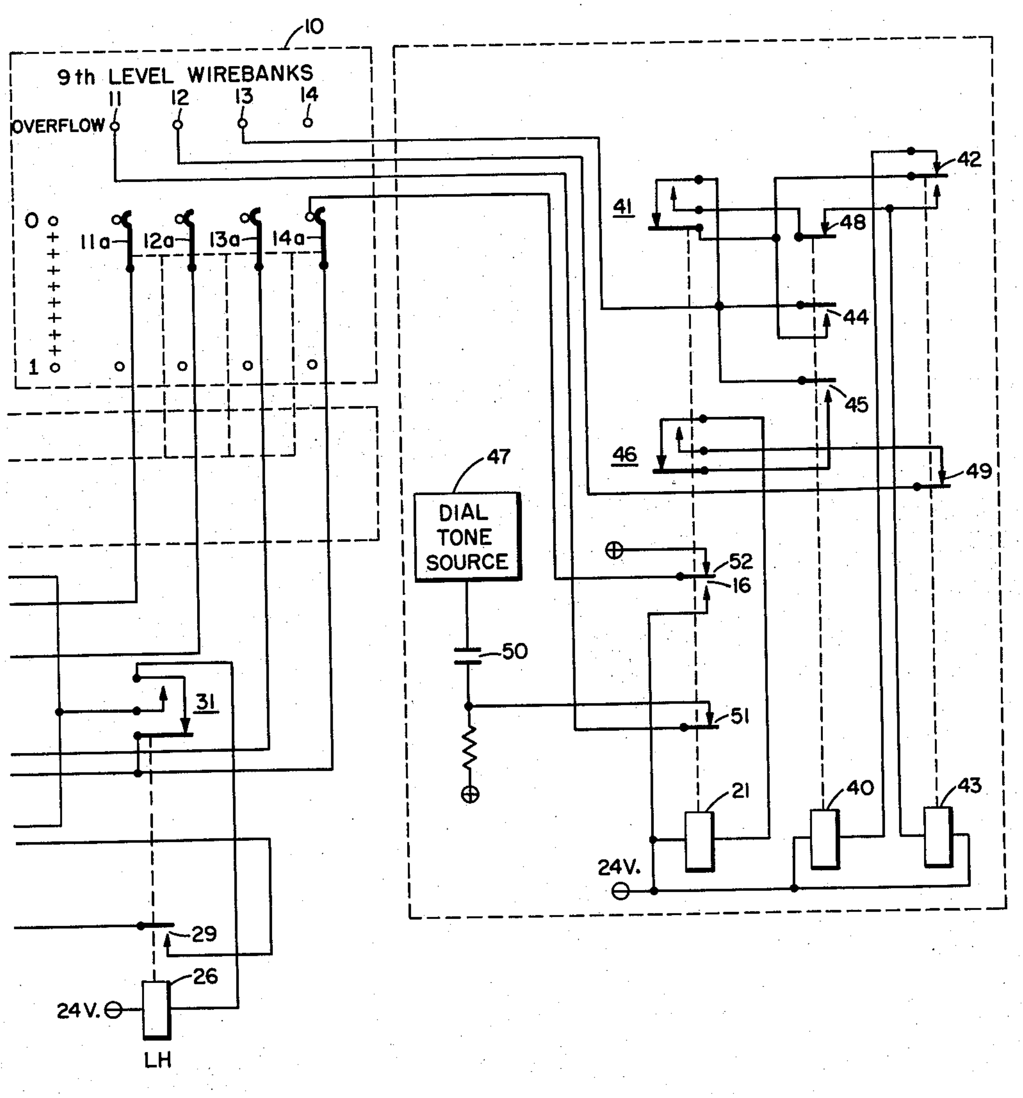

Other features and objects of my invention will become apparent as this description proceeds with reference to FIGS. 1A and 1B which, when taken together, are a schematic diagram of the system of my invention.

Referring now to FIGS. 1A and 1B, my invention will be described with reference to the well known "XY" two-directional universal switch. However, only that portion of the two-directional universal switch which is necessary to describe my invention will be shown. Since my invention is equally applicable to a unidirectional universal switch, my description of the operation of the two-directional universal switch will be limited to discussion of the stepping of the switch in the Y-direction and the associated circuitry for controlling the movement in the Y-direction. Therefore, I have illustrated only a fragmentary portion of a particular level of the wire banks and a portion of one connector switch for controlling the movement of the wipers in the Y-direction. Even though only one connector and one subscriber station are shown, it will be recognized that other connectors of duplicate design will be provided for completing connections to other subscriber stations in the system in the same manner as the subscriber station 15 is connected to the conference circuit.

Referring now to the figures, the ninth level of wire banks 10 is illustrated showing the wires of the first, tenth and the overflow positions in the ninth level. Each position in wire banks 10 is comprised of audio wires 11 and 12 and control wires 13 and 14. In accordance with the preferred embodiment of my invention, the number assigned to the conference line is "90." Assuming that wipers 11*a*, 12*a*, 13*a* and 14*a* have been stepped to the ninth level of the wire banks in response to dialing of the digit "9," pulses from the dial of subscriber station 15, in response to the dialing of the digit "0," are applied through operated make contacts 17 of the slow release DS relay to Y-step magnet 18, as is well known in the art. Make contacts 17 of operated DS relay 19 thus provide means for applying dial pulses to Y-step magnet 18 in response to dialing the second digit. Thus, wiper 14*a* comes to rest upon wire 14 in the tenth position. Ground is applied to this wire through break contacts 52 of unoperated conference privacy relay 21. As will be hereinafter explained, conference privacy relay 21 will be in its unoperated condition assuming that the conference circuit is idle. Wiper 14*a* thus applies the ground through break contacts 22 of the unoperated ST relay 23, operated Y-off-normal make contacts 32, and break contacts 24 associated with Y-step magnet 18 to sequence control relay 25, the other side of which is returned to —48 volt battery. Thus, SC relay 25 operates upon wiper 14*a* finding a ground potential on wire 14 in the tenth position of the wire banks. In addition, this ground is also applied to operate line hunting relay 26 through the break contacts of make-before-break contacts 31.

The operation of relays 25 and 26 applies a ground to step magnet 18 through make contacts 27 of SC relay 25, break contacts 28 of unoperated ST relay 23, and make contacts 29 of LH relay 26. Thus, the Y-step magnet is energized causing the wipers to go to the overflow position.

The SC relay 25 is locked up over the path traced from —24 volts through its make contacts 55, operated Y-off-normal make contacts 32, and unoperated Y-step break contacts 24. Line hunt relay 26 also locks up over the path to ground through the make contacts of make-before-break contacts 31 and operated Y-off-normal switch 32.

Switchthrough relay 23 is then operated from the ground applied through contacts of overflow switch 33, which operates upon the wipers going into the overflow position.

The operation of SC relay 25 prepares a dial path from subscriber station 15 to wipers 13*a*, which may be traced through break contacts 34 of DS relay 19, which drops out upon completion of the dialing operation, and its make contacts 35. This path is completed upon the operation of ST relay 23 through its make contacts 36. Thus, a dial path from subscriber station 15 may now be traced from the dial contacts to wire 13 in the overflow position. The operation of ST relay 23 also completes the talking path from the secondary of audio transformer 30 through its make contacts 38 and 39 to wipers 11*a* and 12*a* and, consequently, the conference circuit established over wires 11 and 12 in the overflow position.

When all of the parties to the conference are connected to the conference circuit, one of the parties, for example, the party at subscriber station 15, dials the digit "1." This applies the momentary ground pulse over the dial circuit previously traced to wire 13 in the overflow position. This ground pulse operates relay 40 over the break contacts of the make-before-break contacts 41 associated with unoperated relay 21 and break contacts 42 of unoperated relay 43. Relay 40 is held during the pulse by its operated make contacts 44 and break contacts 42 of unoperated relay 43.

Operation of relay 40 applies the dial pulse to relay 21 over its operated make contacts 45 and the break contacts of make-before-break set of contacts 46 associated with relay 21. Relay 21 thus operates and is locked up over the path to ground through its make contacts of make-before-break contacts 46, unoperated contacts 49 of relay 43, wire 12 of the overflow station, wiper 12*a*, make contacts 39 of operated ST relay 23, and the secondary of audio transformer 30. Thus, relay 21 is operated in response to the momentary operation of relay 40 and thereafter locks itself up over the talking path to ground. Since relay 40 is only operated during the dial pulse, it drops out after the dial pulse ceases thus preparing an operating path for relay 43 by the making of break contacts 48. Upon of conference privacy relay 21, its make contacts of contacts 41 completes the energizing path for relay 43 so that relay 43 is ready to be operated by the next dial pulse.

When wipers 11*a*, 12*a*, 13*a* and 14*a* go into overflow, dial tone is immediately applied to the subscriber stations entering the conference over the circuit from dial tone source 47. This circuit comprises capacitor 50, break contacts 51 of relay 21, wire 11 at the overflow station, wiper 11*a*, make contact 38 of ST relay 23, a secondary winding of audio transformer 30, and make contact 55 of SC relay 25. This dial tone path is broken at contacts 51 upon the operation of conference privacy relay 21, thereby removing dial tone from the conference circuit in response to the dialing of the digit "1" by one of the parties to the conference. In addition, wire 14 in the tenth position is disconnected from ground upon operation of relay 21 by the breaking of contacts 52 and connected to the —24 volt potential by the making of contacts 16. The placing of the —24 volt potential on control wire 14 of the tenth station serves to mark the conference circuit busy to any subscribers dialing the conference number "90" since line hunting relay 26 will not operate when wiper 14*a* senses a —24 volt potential since it is returned to —24 volt battery. Thus, the path for energizing Y-step magnet 18 remains open at make contacts 29 of LH relay 26 thus preventing the operation of Y-step magnet 18. Thus, it can be seen that access to the conference circuit is denied to any party dialing conference number "90" after one of the parties to the conference has placed the conference circuit in privacy by dialing the digit "1."

To summarize, when the conference circuit is in privacy, relay 21 is operated being locked up over the talking path, while relays 40 and 43 remain unoperated, relay 40 having dropped out upon completion of the dial pulse. Thus, it may be seen that the conference circuit once placed in privacy will remain in privacy until the last party leaves the conference circuit, thus breaking the holding path to relay 21.

Thus, any of the parties to the conference may drop out without taking the conference circuit out of privacy. However, for any party to enter the conference once it has been placed in privacy, a party to the conference must dial the digit "1" again to take the conference circuit out of privacy to allow additional parties to come into the conference. This additional dial pulse will operate relay 43 over the make contacts of set of contacts 41 of relay 21 and break contact 48 of relay 40. Operation of relay 43 breaks the holding path of relay 21 at break contact 49, thus forcing relay 21 to drop out. Thus, the —24 volt busy marking potential on wire 14 of the tenth station is removed and the ground is reapplied. In addition, the dial tone is again applied to the conference circuit over break contacts 51. When the additional dial pulse ceases, relay 43 drops out, thus returning the conference privacy circuit to its normal condition in which relays 21, 40 and 43 are unenergized.

To place the conference in privacy again, one party must again dial the digit "1." The same process that was described before will then take place to again place the conference circuit in privacy.

While I have shown and described a specific embodiment of my invention, other modifications will readily occur to those skilled in the art. I do not, therefore, desire my invention to be limited to the specific arrangement shown and described, and I intend in the appended claims to cover all modifications within the spirit and scope of my invention.

What is claimed is:

1. In an automatic telephone system, the combination comprising a plurality of N lines, each having an associated subscriber station; means responsive to the receipt of predetermined directive signals from said subscriber stations for automatically establishing a conference circuit between stations which have transmitted said predetermined directive signals; means connected to said conference circuit responsive to the receipt of a first additional directive signal for denying access to said conference circuit by any other line of said system; and means connected to said conference circuit and responsive to the receipt of a second additional directive signal for granting access to said conference circuit by any other line of said system.

2. In an automatic telephone system, the combination comprising a plurality of N lines, each having an associated subscriber station; means responsive to the receipt of predetermined directive signals from said subscriber stations for automatically establishing a conference circuit between said stations which have transmitted said predetermined directive signals, said conference establishing means comprising wire banks having first and second audio wires and first and second control wires at each station in a given level, a plurality of N circuits each of which comprises, a switching means having first and second audio wipers and first and second control wipers for selectively establishing connections to the stations in said level under control of said directive signals, means responsive to the receipt of said predetermined directive signals for stepping said wipers to a predetermined one of said stations, means responsive to said first control wiper sensing a first potential on said first control wire of said predetermined station for moving said switching means to the next succeeding station, means responsive to said switching means arriving at said next succeeding station for completing said conference circuit from said subscriber station to said audio wires of said next succeeding station and for completing a directive signal path from said subscriber's station to said second control wire at said next succeeding station; and means connected to said conference circuit responsive to the receipt of an additional directive signal for denying access to said conference circuit by any other line of said system, said access denying means comprising first and second sources of potential, means for connecting, when in its unoperated condition, said first source of potential to said first control wire at said predetermined station, said potential connecting means serving to connect, when in its operated condition, said second source of potential to said first control wire at said predetermined station, and means for operating said potential connecting means in response to the occurrence of said additional directive signal on said second control wire of said next succeeding station, said moving means being non-responsive to the sensing of said second potential to thereby deny access by other subscriber stations to the established conference circuit.

3. The combination of claim 2 further comprising a source of dial tone, means for connecting, when in its unoperated condition, signals from said dial tone source to said conference circuit, said dial tone connecting means being operative to remove said dial tone from said conference circuit, said operating means being responsive to the occurrence of said additional directive signal for operating said dial tone connecting means.

4. The combination of claim 3 in which said directive signals are momentary pulses and said operating means comprises a first relay, and means for connecting said first relay across said directive signal path, said first relay being operable in response to the receipt of said additional momentary pulse, said potential connecting means and said dial tone connecting means comprising make contacts controlled by said first relay.

5. The combination of claim 4 in which said first relay connecting means comprises a normally open connection between said first relay and said second control wire of said next succeeding station, means for completing said normally open path in response to the receipt of said momentary pulse, and means for maintaining said first relay in its operated state until the last party leaves the conference.

6. The combination of claim 5 further comprising a second relay and means for connecting said second relay across said directive signal path in response to the operation of said first relay, said second relay being rendered operative in response to the receipt of a directive signal pulse from said signal path, and means for rendering said maintaining means ineffective in response to the operation of said second relay to thus cause said first relay to return to its unoperated condition thereby removing said second potential from said first control wire.

7. The combination of claim 6 in which said means for completing said normally open path comprises a third relay having normally open contacts in series between said first relay and said second control wire, and means for operating said third relay during the continuance of a momentary pulse upon said second wire when said first and second relays are in their unoperated condition to thereby momentarily energize said first relay.

8. The combination of claim 7 in which said moving means comprises means energizable for stepping said wipers in discrete steps from station to station in response to its repetitive energization, means for energizing said stepping means for stepping said wipers from said predetermined station to said next succeeding station comprising first and second series connected, normally open contacts, fourth and fifth relays for respectively controlling said first and second normally open contacts, means for connecting said fourth and fifth relays to said first control wiper, said fourth relay being energizable by either said first or said second potentials applied to said first control wire, said fifth relay being energizable by only said first potential, whereby said stepping means is energizable for stepping said wipers from said predetermined station to said next succeeding station only when said first control wiper finds said first potential at said predetermined stations.

References Cited in the file of this patent

UNITED STATES PATENTS

| | | |
|---|---|---|
| 1,679,567 | Gardner | Aug. 7, 1928 |
| 2,386,126 | Lomax | Oct. 2, 1945 |